United States Patent [19]

Eccardt

[11] 4,428,520

[45] Jan. 31, 1984

[54] FEED MECHANISM FOR A POWER TOOL

[75] Inventor: Curtis J. Eccardt, St. Charles County, Mo.

[73] Assignee: Emerson Electric Co., St. Louis, Mo.

[21] Appl. No.: 356,653

[22] Filed: Mar. 10, 1982

[51] Int. Cl.³ ............................................. B65H 17/26
[52] U.S. Cl. ..................................... 226/141; 226/158
[58] Field of Search .............................. 226/137–141, 226/147, 149, 158, 161, 162; 83/206, 208, 277, 409, 794, 796, 801; 269/56, 58, 63

[56] References Cited

U.S. PATENT DOCUMENTS

| | | | |
|---|---|---|---|
| 3,485,430 | 12/1969 | Scribner | 226/141 |
| 3,504,585 | 4/1970 | Harris | 83/42 |
| 3,537,392 | 11/1970 | Ikuss | 226/141 X |
| 3,688,962 | 9/1972 | Schmitt | 226/141 |
| 4,117,756 | 10/1978 | Harris | 83/801 |
| 4,179,961 | 12/1979 | Harris | 83/206 |

Primary Examiner—Leonard D. Christian
Attorney, Agent, or Firm—Polster, Polster and Lucchesi

[57] ABSTRACT

A feed mechanism for feeding a work piece to a tool includes a control system for monitoring feed operation. The feed mechanism includes at least one vise movable with respect to a support structure to advance a work piece. The amount of movement permitted the movable vise is adjustable by a coarse and fine adjustment system employing simplified structure for setting the stop defining the movable vise start feed position. The movable vise is driven by a mechanism interconnected to the movable vise by a pin and slot arrangement which permits the vise to accommodate warped work pieces. Preferably, the feed mechanism includes a second fixed vise, one jaw of which is adjustable to permit parallel alignment of vise jaws forming the fixed vise. The control system employs a manifold having a mounting surface for interconnecting various ones of the devices operating the feed at a central, programmable location.

22 Claims, 9 Drawing Figures

FEED MECHANISM FOR A POWER TOOL

BACKGROUND OF THE INVENTION

This invention relates to feed systems for work tools, and in particular, to a feed system for a band saw. While the feed mechanism is described with particular reference to its band saw application, those skilled in the art will recognize the wider applicability of the inventive principles disclosed hereinafter.

A number of automatic feed arrangements are known in the prior art. In general, these prior art devices operate to incrementally advance a work piece past a work station where operations may be conducted on the work piece. In the case of a band saw, large length pieces are advanced through a cutting station, where they are cut into smaller incremental parts for later use in a construction process.

As indicated, feeds of various kinds have been known for a long time. Automatic feeds are employed extensively in punch press operations, for example. In such an operation, some form of shuttle vise is provided to advance the work piece incrementally across an operating position where an operation is conducted on the work piece. This same arrangement has been employed in feeds for other devices. For example, the U.S. Pat. to Harris, No. 3,504,585 adopts this form of feed arrangement to a band saw.

While these prior art arrangements have worked for their intended purposes, as a class they exhibit relatively high initial cost, are not readily adaptable in the field to a particular machine, and are not capable of standardization in construction so as to facilitate their use for a variety of feed or associated equipment sizes because of various deficiencies in their design.

The invention disclosed hereinafter overcomes these prior art difficulties by providing a feed unit which is compatible with a wide variety of machine tools. The unit as designed is intended to be field attachable. That is to say, the feed can be attached to a band saw, for example, without requiring the removal of the band saw from its field installation. Feed attachment itself can be accomplished with simple tools. The control system employed for controlling feed operation can be adapted to a wide range of feed mechanisms. In the embodiment discussed hereinafter, the control system is employed in conjunction with a fluid system, preferably pneumatic, although an electrically operated control can be employed if desired. In the fluid control system of the present invention, a centrally located processor is utilized to receive signal inputs from a plurality of sensors, and to provide fluid control signals to various operating devices to control feed operation. These fluid control signals, in the embodiment illustrated, operate directly on various drive cylinders of the feed mechanism. With larger feed mechanism designs, the same control system can be employed to provide pilot signals to control the operation of larger hydraulic, pneumatic or other types of fluid devices.

There are a number of particular areas which distinguish the feed mechanism of my invention over other prior art designs in addition to the control system mentioned above. The feed mechanism of this invention employs a simplified adjustment system providing both coarse and fine adjustments for feed set up, so that an operator can incrementally and precisely adjust the incremental length of cut of a band saw, for example. In addition, the invention disclosed hereinafter employs an improved shuttle vise design that ensures accurate stroke direction while permitting the accommodation of irregular stock material work pieces. Because of the structural features disclosed hereinafter, I can produce a feed mechanism having a greater variety of features, and produce it at a lower cost than those previously available and disclosed in the prior art.

One of the objects of this invention is to provide an improved feed system for a work tool.

Another object of this invention is to provide a feed system for a work tool employing a control mechanism which may be utilized over a wide range of feed system sizes.

Another object of this invention is to provide a feed system having an adjustment scheme providing both a quick coarse position adjustment and a fine adjustment for regulating the feed length of a shuttle vise.

Another object of this invention is to provide a feed system which is adaptable for use with a variety of machine tools and may be readily connected to those tools.

Another object of this invention is to provide an indexing mechanism which automatically compensates for warpage and other nonuniform characteristics of a work piece.

Yet another object of this invention is to provide an indexing mechanism which ensures straight line operation of a drive mechanism for a shuttle vise but permits the vise to float to accommodate warpage in the work piece.

Other objects will be apparent to those skilled in the art in light of the following description and accompanying drawings.

SUMMARY OF THE INVENTION

In accordance with this invention, generally stated, a feed mechanism is provided which includes a bed supporting at least one movable vise. The feed mechanism is controlled by a pre-programmed control, which in the preferred embodiment, includes a manifold having a plurality of fluid actuated devices associated with it. The manifold can be pre-programmed to perform a series of steps based on feed mechanism operation as sensed by a plurality of sensors operatively connected to the manifold. The feed mechanism includes an adjustment for setting feed length including first and second adjustments corresponding to coarse and fine adjustments, respectively, the final setting of which defines a stop for the movable vise. The movable vise is operatively connected to a drive mechanism through a pin and slot arrangement which enables the movable vise to accommodate warpage in a work piece. In the preferred embodiment, a second, stationary vise includes an adjustment for permitting jaws of the vise to be set square with respect to one another.

DESCRIPTION OF THE PREFERRED EMBODIMENT

Figure 1:
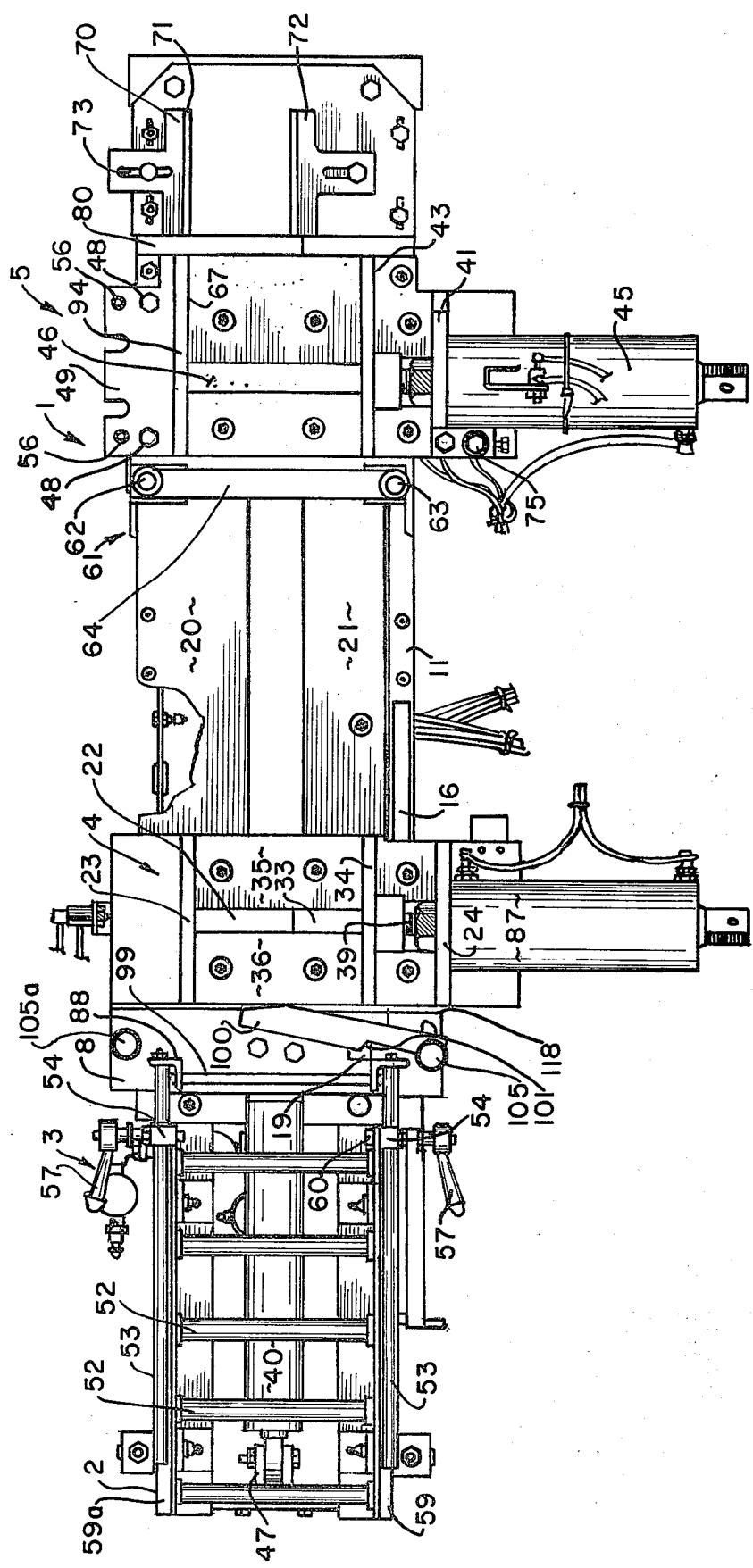
FIG. 1 is a top plan view of one illustrative embodiment of feed mechanism of this invention.

Referring now to FIG. 1, reference numeral 1 indicates one illustrative embodiment of feed mechanism of this invention. The feed mechanism 1 includes a bed 2 for supporting various components of the feed mechanism 1, an adjustment means 3, a first movable vise 4, a stationary vise 5, and a control system 6, described in greater detail hereinafter.

Figure 3:
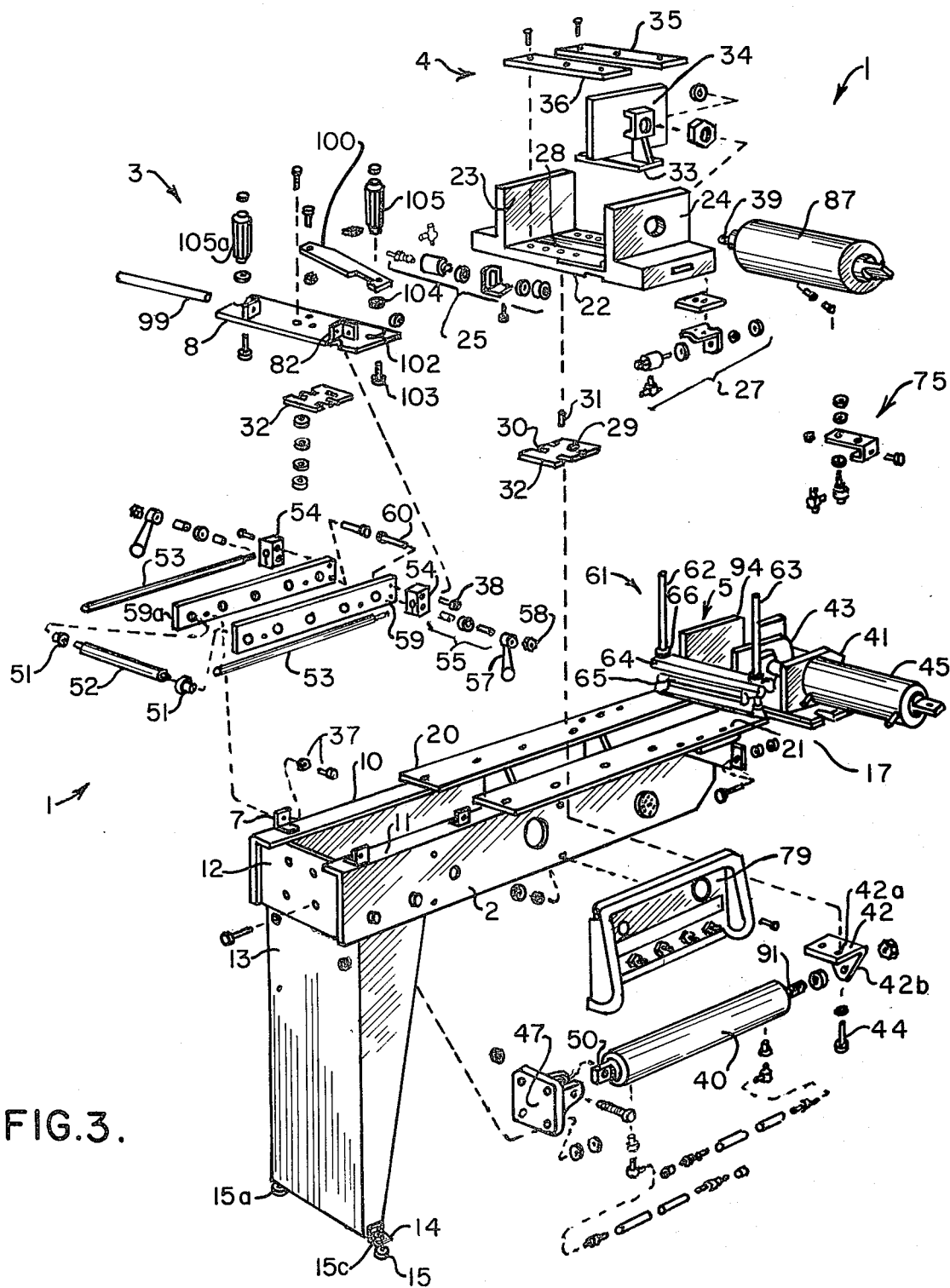
FIG. 3 is an exploded view, in perspective, of the device shown in FIG. 1.
Figure 4:
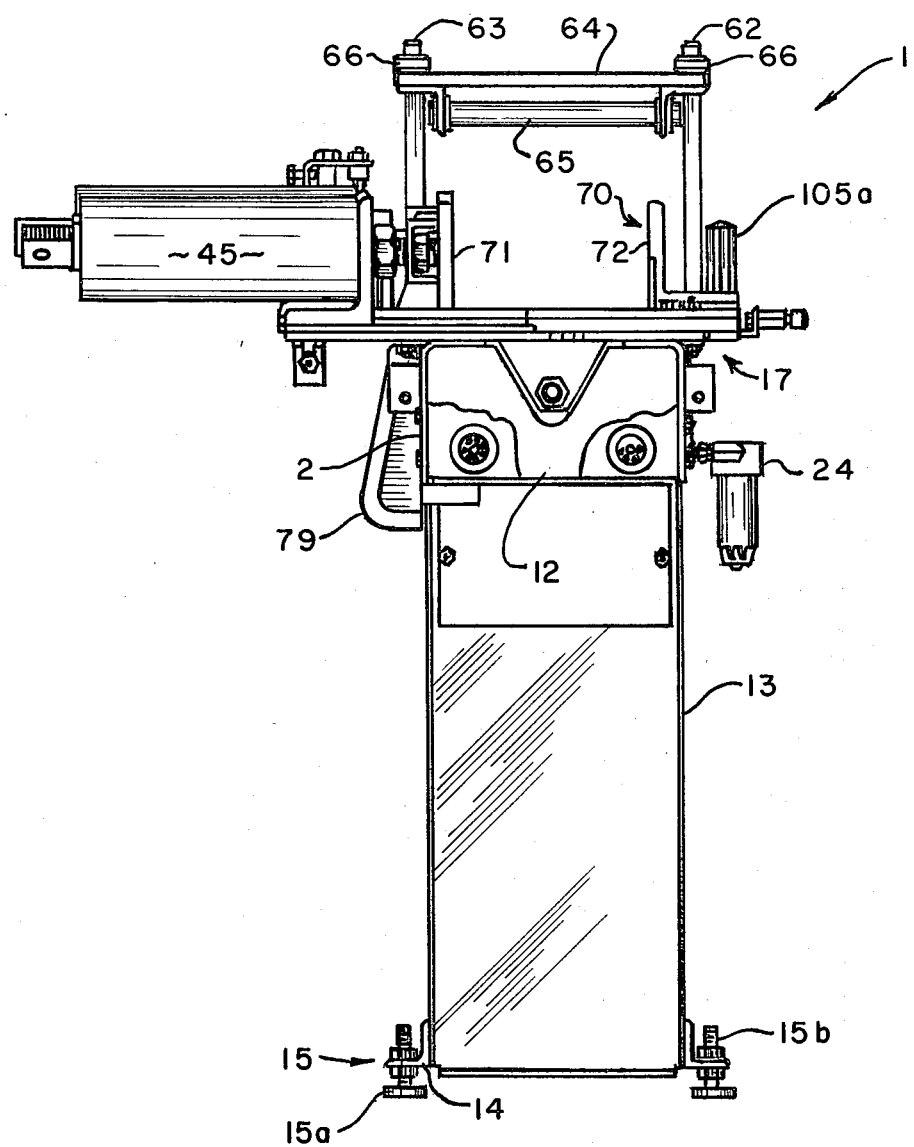
FIG. 4 is a view in end elevation thereof.

As is best seen in FIG. 3, the bed 2 includes a pair of channel members 10 and 11 interconnected with one another along an end piece 12 positioned with respect to ground level by a leg structure 13. Leg structure 13 conventionally is relatively heavy gauge sheet metal formed into a convenient design silhouette. The sheet metal may be attached to more rigid structural members, where required. In any event, a pair of brackets 14 are attached along the bottom edge of the leg structure 13. The brackets 14 are L-shaped, one leg of the L being attached to the leg structure 13 and the perpendicular part of the L having a threaded opening formed in it and sized to receive a leveler 15. The levelers 15 each include a pad 15a and a shaft 15b which is adjusted to obtain a true horizontal attitude for the feed mechanism 1 after attachment of the mechanism 1 in its intended application.

A pair of wear plates 20 and 21 are mounted to the channel members 10 and 11 by any convenient method. I employ threaded fasteners for most such attachments. The bed 2 has an end 17 which rests upon a support structure 18 of an associated power tool or the like and the levelers 15 are adjusted so that the feed 1 lies in a proper horizontal plane with the associated power tool.

The channel members 10 and 11 have a pair of bearing supports 59 and 59a, respectively, mounted to them by a plurality of brackets 7. The brackets 7 are welded or otherwise fixed to the channel members 10 and 11. The brackets 7 in turn have the bearing supports 59 and 59a attached to them by any convenient method. A conventional threaded fastener and lock washer 37 works well, for example. The bearing supports 59 and 59a have a plurality of rollers 52 rotatably mounted to them along sleeve bearings 51.

A pair of rods 53 are attached to a stop plate 8 at a bracket 88. The rods 53 are supported by and are housed in respective ones of a pair of clamps 54. Each of the clamps 54 is of a split collar type, which design permits movement of the plate stop 8 and rod 53 through the clamp 54 upon loosening of a lock arrangement which includes a bolt 60 extending through the bearing support 59, a spacer and washer combination 55 and a wrench 57 housing a nut 58. The nut 58 is moved along the bolt 60 to clamp or loosen the split collar of the clamp 54. Loosening of the clamp 54 permits movement of the stop plate 8 and rod 53 along the clamp 54. As best seen in FIG. 3, each of the clamps 54 is mounted to the bearing supports 59 by conventional threaded fasteners 38.

The channel 11 has a marking device 16 mounted to it, best seen in FIG. 1. In the preferred embodiment, the marking device 16 is in the form of a conventional ruler. Loosening of the wrench 57 enables the stop plate 8 and rods 53 to be moved along the channels 10 and 11 so that an edge 118 of the stop plate 8 may be aligned with indicia on the marking device 16 to adjust the coarse stop position of the vise 4, as later described in greater detail.

The actual stop position for the vise 4 is delimited by an adjustable stop 100 mounted to the stop plate 8. The stop plate 8 has a second microadjustment means 19 positioned on it, best seen in FIG. 1, which is read along an edge 101 of the stop 100. As shown in FIG. 3, the stop plate 8 has an arcuate opening 102 formed in it. A threaded fastener 103 is sized to fit through the opening 102 and is releasably engaged by a knob 105. A washer 104 is mounted between the stop 100 and the stop plate 8 in the intermounted position of the stop 100. The stop plate 100 provides a fine adjustment of the feed length for the feed mechanism 1. The adjustment is accomplished relatively easily. The knob 105 is loosened, and the stop 100 is moved to a desired position with respect to the inidicia carried by the microadjustment means 19. This final adjustment provides a stop position which in turn defines an initial start position for the vise 4 during feed operation of the mechanism 1.

A second knob 105a also is attached to the stop plate 8. The knobs 105, 105a enable a user to make the coarse adjustment easily, once the clamps 54 are loosened, as previously described. The single knob 105 release also enables a user to make the fine adjustment easily, after having first retightened the clamps 54. A roller 99 is mounted between the brackets 88 on the stop plate 8, which provides a smooth transistion of a work piece over the adjustment means 3 during feed mechanism 1 operation. A vise guide 32 is attached to the stop plate 8 and fits between the wear plates 20 and 21 in a close tolerance but freely movable fit. The vise guide 32 enables the stop plate 8 to be moved into position easily, even when the plate 8 is moved over the wear plates 20 and 21 by releasing of the wrenches 57 as described above. The vise guide 32 is described in greater detail in conjunction with the vise 4 structure hereinafter. It is important here to note only that the same part is used both in conjunction with the vise 4 and with the adjustment means 3 which results both in simplified construction and in a reduced part inventory.

A cylinder support 47 is mounted to the end piece 12 of the bed 2. The cylinder support 47 has a cylinder 40 mounted to it along a first end 50 of the cylinder, while a rod end 91 of the cylinder 40 is operatively connected to a drive end cylinder support 42. A conventional pin and clevis construction is employed. As indicated above, I prefer to utilize pneumatic pressure for operating the feed 1. Consequently, the cylinder 40 is of a pneumatic type. However, other power sources may be employed, if desired.

The cylinder support 42 has an upper side 42a and an integrally formed, depending side 42b to which the rod end 91 of the cylinder 40 is attached. The surface 42a of the cylinder support 42 is intended to ride below the surface of the wear plates 20 and 21 during the feed stroke of the feed mechanism 1. The attachment of the cylinder support 42 to the vise 4 is an important feature of my invention. That interconnection is arranged so that fasteners 44, extending through the upper surface 42a of the cylinder support 42, pass through spacers 31 which are undersized with respect to a pair of slots 30 formed in the vise guide 32. The fasteners 44 then are attached along the bottom side of a base plate 22 of the vise 4. The vise guide 32 also has a second slot 29 formed in it, and an undersized fastener, not shown, is inserted through the slot in a loose free fit to mount the forward portion of the vise guide 32 to the base plate 22. As thus described, the base plate 22 and cylinder support 42 are free to float along the slots 30 and slot 29, while the vise guide 32 is constrained between the wear plates 20 and 21. This construction permits the vise 4 to accommodate warpage in a work piece as it moves between the initial position defined by the adjustable stop 100 and a forward position of the vise 4, determined by the stroke of the rod 91 of the cylinder 40 and back again, without jamming. That is to say, the cylinder 87 opens a gap between the vise 4 and a work piece carried by the vise after advancement of that work piece. The vise 4 then is returned to the initial position. Excessive warpage of a work piece can cause the vise 4 to jam as the cylinder 40 attempts to return the vise 4 to the initial position. Because of the interconnection described above, the vise 4 is free to float to accommodate such a nonlinear work piece. That interconnection eliminates jamming except under the most severe conditions, generally not encountered in normal operation. As indicated above, the vise guide 32 rides in or slightly partially above the channel defined by the wear plates 20 and 21. In its dimensional aspects, the vise guide 32 is maintained in a relatively close tolerance fit with respect to that channel. The close tolerance between the vise guide 32 and the channel delimited by the wear plates 20 and 21 requires that the cylinder 40 accurately repeat its reciprocal motion, while the vise 4 itself is free to accommodate warpage of a work piece.

Vise 4 includes the base plate 22 having a stationary vise jaw 23 and a cylinder support 24 mounted to it. A limit switch assembly, indicated generally by the reference numeral 25 and shown in exploded view in FIG. 3, is mounted to the base plate 22. The limit switch 25 is intended to be actuated when no work piece is present in the vise 4. That is to say, the limit switch assembly 25 is a sensor which provides a first signal when a work piece is present in the vise 4 and provides a second signal when no work piece is present. Presence of a work piece in the vise 4, which is signalled by the limit switch 25, permits the feed mechanism 1 to continue its operation automatically. A second limit switch 27, shown in exploded view in FIG. 3, also is attached to the base plate 22 and is intended to strike a stop 26 to signal the end of the advancement or the feed extension length for the vise 4 under the positive stroke control of the cylinder 40. The operation of the feed mechanism 1 is described in greater detail hereinafter.

The base plate 22 has a slot 28 formed in it, which is sized to receive a corresponding bracket 33 of a movable vise jaw 34. The vise jaw 34 is held in position by a pair of plates 35 and 36 respectively. The plates 35 and 36 are attached to the base plate 22 by conventional fasteners. The cylinder 87 is attached to the cylinder support 24. The cylinder 87 has a rod 39 which moves the vise jaw 34 reciprocally along the base plate 22 between clamped and unclamped positions with respect to a work piece, depending upon the operating condition of the feed mechanism 1.

Figure 2:
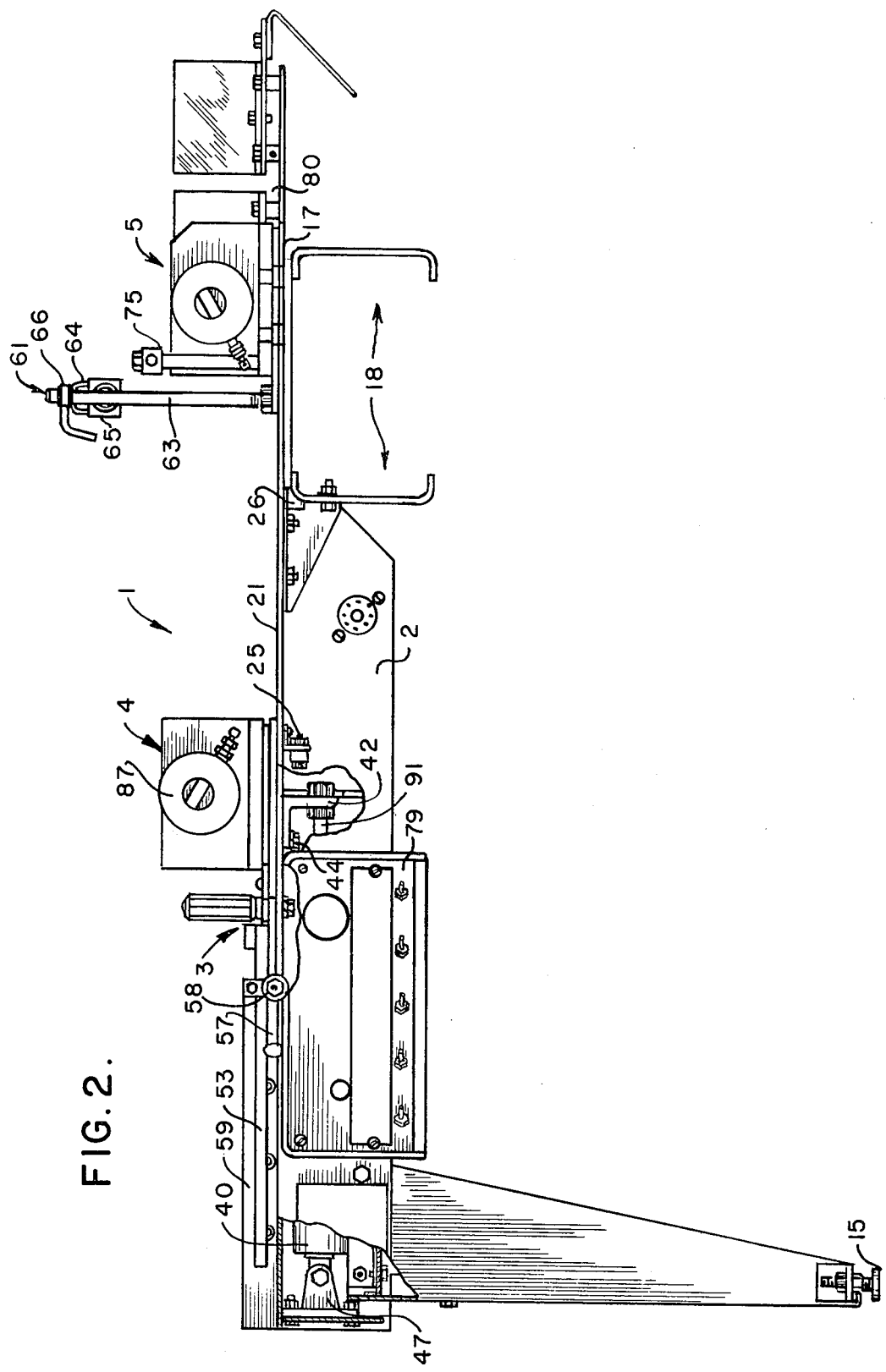
FIG. 2 is a view in side elevation, partly broken away, of the device shown in FIG. 1.

Referring now to FIGS. 1-3, mounted forward of the vise 4 is a hold down means 61. The hold down means 61 includes a pair of vertical supports 62 and 63, which are mounted to the wear plates 20 and 21. In the embodiment illustrated, the supports 62 and 63 are cylindrical rods which are sized to receive a horizontal clamp bar 64. The clamp bar 64 in turn mounts a horizontal hold down roller 65 along with lockable collars 66. Hold down roller 65 is vertically adjusted on supports 62 and 63 until it bears on the upper surface of the work piece therebelow. The hold down roller 65 functions to prevent a work piece being carried along the feed mechanism 1 from raising upward of the support bed 2 during operation of the feed 1.

The vise 5 includes a cylinder support 41, a movable vise jaw 43 and an adjustable but stationary vise jaw 94. The reciprocal operation of the jaw 43, which is provided by a cylinder 45, is similar to that described in conjunction with jaw 34 of the vise 4, and is not described in detail. Again, the vise jaw 43 is adapted to move between clamped and unclamped positions with respect to a work piece under positive control of the cylinder 45.

The jaw 94 of the vise 5 is adjustable with respect to the jaw 43. The jaw 94 is mounted to a support plate 46 by a pair of threaded fasteners 48. A base area 49 of the jaw 94 has a pair of mounting openings 120 formed in it, which receive bolts to attach the jaw to the plate 46. The base area 49 also has a second pair of openings 121 formed in it, which receive respective ones of a pair of camming or jack screws 56. The camming screws 56 bear against the support plate 46, and by loosening the bolts or threaded fasteners 48 attaching the jaw 94 to the plate 46, the camming screws 56 can be adjusted to vary the attitude of a face 67 of the vise jaw 94. When a desired attitude is achieved, the fasteners 48 again are re-tightened to maintain the newly selected attitude of the face 67.

Positioned outboard of the vise 5 is a vise 70 which includes a pair of stationary jaws 71 and 72. The jaws 71 and 72 are adjustable along slots 73 and the vise 70 is intended merely to stabilize the work piece as it is being cut, for example. In band saw operations, a slot 80 defined in part by the adjacent ends of the vises 5 and 70 is designed to receive the blade of the band saw as the blade makes it cut.

As shown in FIGS. 1 and 2, a head down stop limit switch 75 is positioned so that the head of a band saw may strike it to indicate that a cut in the work piece has been completed. As will be appreciated by those skilled in the art, commercially available band saws, for example, include a head operating cylinder, not shown, which is used in saw operations not employing the feed mechanism of this invention. I use that cylinder as the device for lowering the saw head during saw operations after feed mechanism 1 is attached to the saw. Additionally, however, I provide a head cylinder 82 for raising the saw head after each cut is made. This arrangement is intended to be represented by the dash line connecting the cylinder 82 to a manifold 76 in FIG. 5. That is to say, a fluid line is operatively connected to only one side of the respective cylinders employed for raising and lowering the saw cutting head. The head cylinder 82 controlling the band saw cutting head upward attitude also includes an upper stop limit actuator 83 which may be adjusted to control the upward rise of the blade so that it just clears a work piece before recommencing its cutting stroke operation, as described hereinafter.

Figure 5:
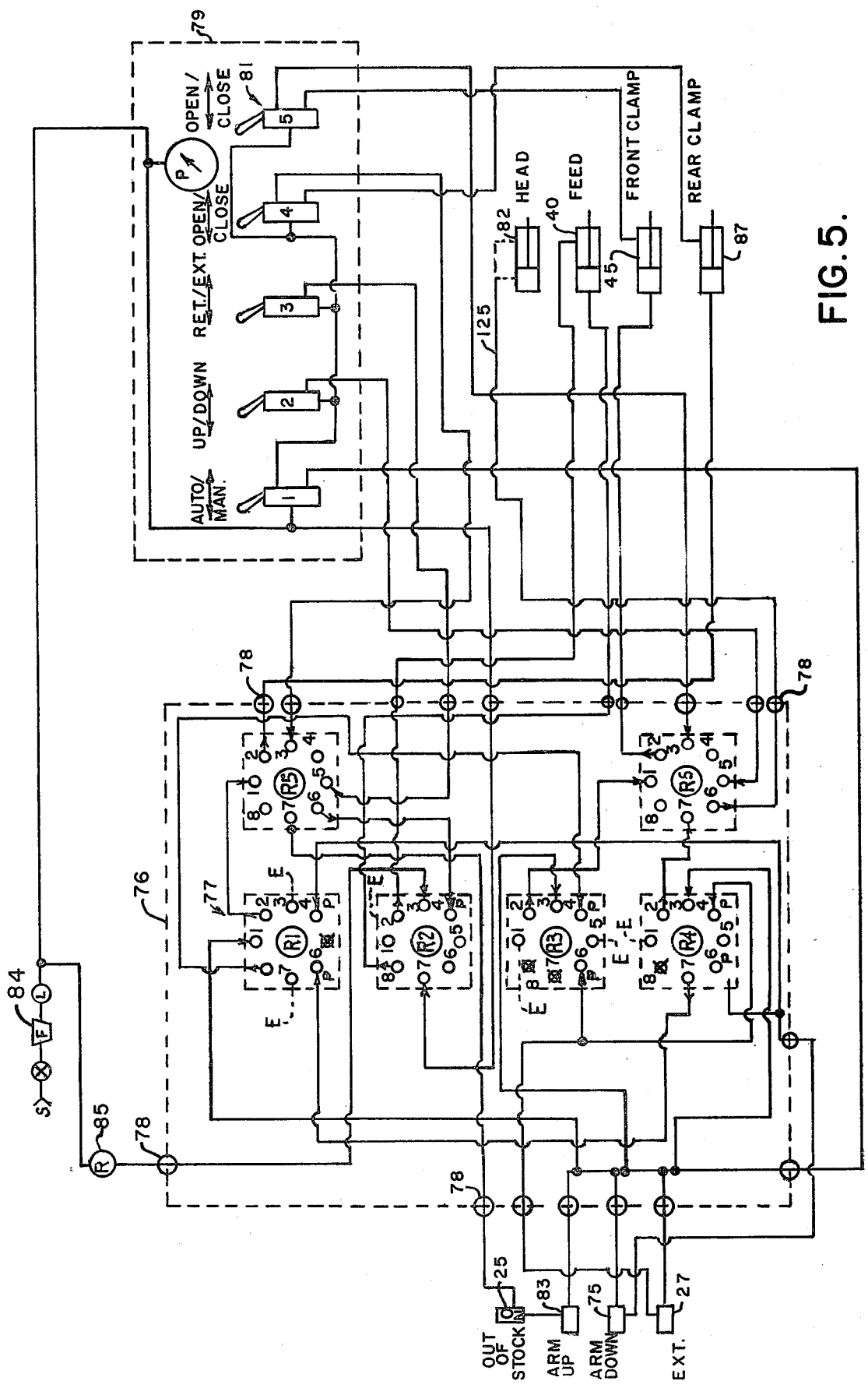
FIG. 5 is a diagrammatic view of control system employed with the device shown in FIG. 1.
Figure 6:
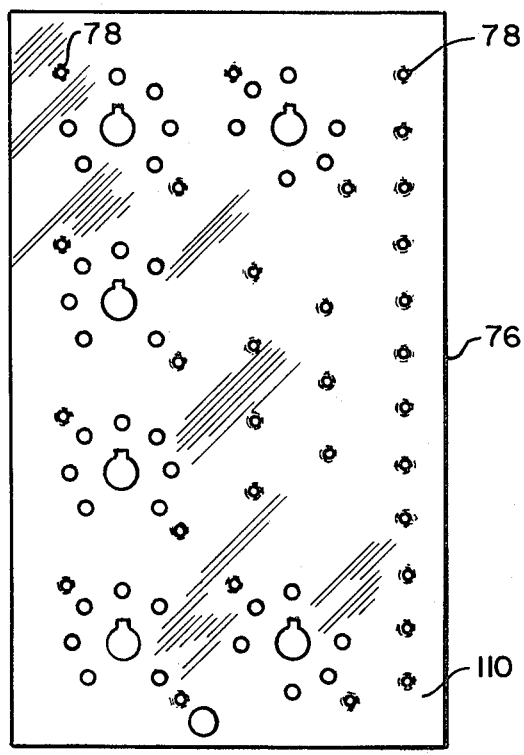
FIG. 6 is a top plan view of the manifold employed in conjunction with the control system of FIG. 5.
Figure 6A:
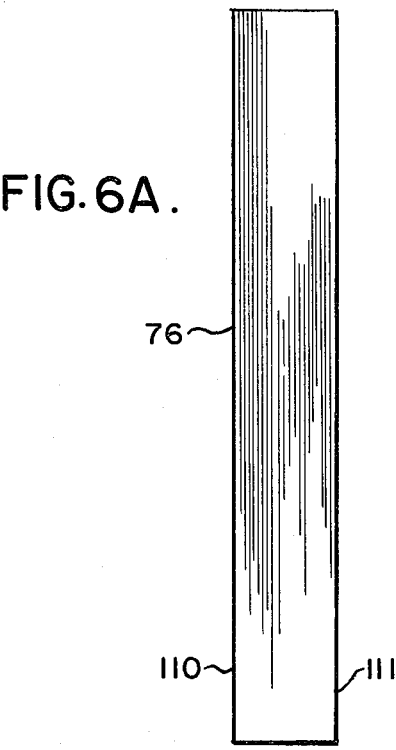
FIG. 6A is a view in side elevation thereof.
Figure 7:
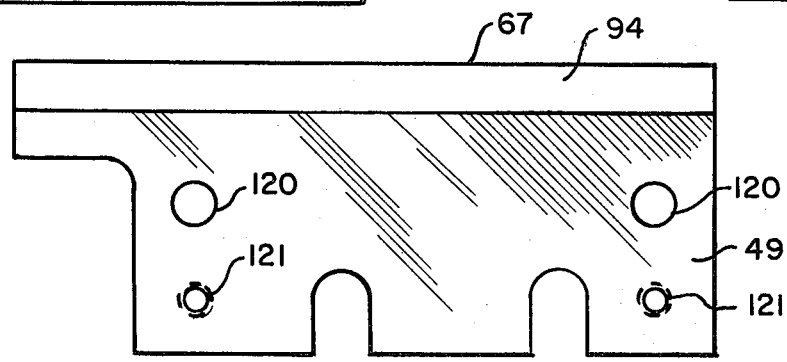
FIG. 7 is a top plan view of a vise jaw employed with the stationary vise of the feed mechanism shown in FIG. 1.
Figure 8:
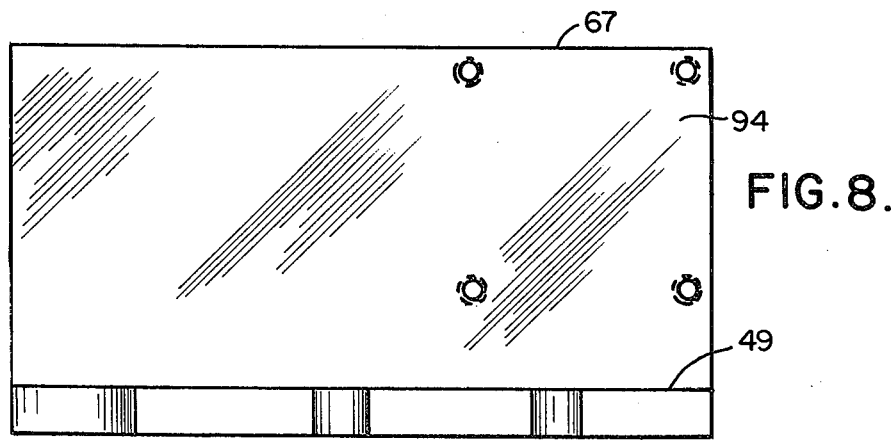
FIG. 8 is a view in side elevation thereof.

Referring now to FIGS. 5, and 6, the control diagram for the feed system 1 and a manifold 76 are shown in greater detail. As there indicated, the manifold 76, represented by the dash line in FIG. 5, has a plurality of control devices 77 mounted to it. The control devices 77 are interconnected automatically by the internal connections of the manifold 76. The connection lines in turn are connected to a plurality of input/output ports, indicated generally by the reference numeral 78.

Manifold 76 is a laminated structure having a device mounting surface 110 and a feed attaching surface 111 separated by the material laminated structural thickness. As best seen in FIG. 6, the manifold 76 is preformed to provide a plurality of mounting locations for the control devices 77. As thus constructed, the manifold 76 is analogous to an electronic processor which receives various input signals and develops the necessary output signals based on the signal input. A control panel 79 has a plurality of switches 81 mounted to it. The switches 81 are interconnected through the manifold 76 to various ones of the cylinders described above. Those cylinders include the feed cylinder 40, the front clamp cylinder 45, the rear clamp cylinder 87, and the head cylinder 82. As indicated, the head cylinder 82 operates to raise the head of a band saw, for example, when the feed mechanism 1 is utilized in conjunction with that device. Likewise, the limit switch 27, the limit switch 25, the limit switch 75 and the limit switch 83, which corresponds to the arm up position described above, all form inputs to the manifold 76. The devices 77 include a three-way valve R1, a four-way valve R2, a three-way valve R-3, a three-way delay valve R4, and a pair of dual shuttle valves R5. The system is powered from a source of fluid pressure, preferably air pressure through the schematic representations shown in FIG. 5. A source of fluid pressure is connected to the manifold 76 through a filter 84 and a pressure regulator 85. The same source is connected to the control panel 79. As indicated in FIG. 5, the device may be operated either manually or automatically. A manual mode is possible to obtain through use of the switch 1, and the switches operate various portions of the system according to their name plate.

In automatic mode, the system operates as follows: assume an initial condition where the cutting arm or head of a band saw, not shown, is in an up position, the vise 4 or shuttle vise is forward but not clamped, and the front vise 5 is clamped closed. Moving the switch 1 from a manual to auto causes the head to start its downward travel. When the head releases the arm up limit switch 83, the shuttle vise 4 feed cylinder 40 is actuated to return the vise 4 against the stop plate 100. The head continues downwardly, makes the desired cut, and strikes the lower limit or arm down switch 75. Hitting the lower limit switch signals the manifold 76 to operatively and simultaneously cause the front vise cylinder 45 to open, closes the rear clamp cylinder 87 and actuate the head cylinder 82 to commence the return of the head. It is important to note that the front vise 5 opens and the rear vise 4 closes after the head of the saw strikes the limit switch 75. Opening the front vise after the cut is made and after the head of saw is moving back toward its raised position enables the cut piece to clear from the groove 80 and gives ample time for the vise 4 to regrip the work piece without requiring additional delay devices required, for example, in Harris U.S. Pat. No. 3,504,585, to provide sufficient time to accomplish clamping. When the head contacts the upper limit switch 83, the feed cylinder 40 is actuated to move the vise 4 forward. When the feed extension limit switch 27 strikes the stop 26, the front vise jaw clamps shut. There is a delay provided to ensure the front view jaw clamping is completed. After the single delay provided in the feed mechanism 1 operation, the head of the saw permitted to start down and the sequence repeats.

Numerous variations, within the scope of the appended claims, will be apparent to those skilled in the art in light of the foregoing description and accompanying drawings. Thus, while certain devices or parts were described as preferred, the parts themselves, their design silhouette or the material from which they are constructed may be altered in other embodiments of this invention. Placement of parts, the sequence of steps and the sequence of operation may be varied. Although I prefer to retain the head down cylinder supplied with a band saw, for example, along with a separate cylinder to raise the head toward its start position, a single cylinder or equivalent device may be used. Various dimension changes may be required to accommodate large work pieces. In like manner, additional supports positioned aft of the feed mechanism 1 may be required to accommodate longer work pieces. These variations are merely illustrative.

Having thus described the invention, what is claimed and desired to be secured by Letters Patent is:

1. A feed mechanism, comprising:
   a bed;
   a first vise supported by said bed;
   a second vise supported by said bed and movable thereon between at least first and second positions;
   means associated with said second vise for accommodating non-planar work pieces;
   means associated with said first vise for adjusting at least one of the pair of jaws forming said vise to enable the jaws of said vise to be set square;
   means for adjusting the length of travel for said second vise including a first coarse adjustment and a second fine adjustment; and
   control means for operating said feed including a control manifold having a plurality of control devices mounted to it, and a plurality of input and output ports positioned on said manifold and adapted to control operation of said feed through said manifold.

2. The feed of claim 1 wherein said control manifold comprises a laminated structure having a mounting face and a plurality of control lines formed therein for connecting various ones of said ports of said device through said control devices.

3. The feed of claim 1 wherein said vise jaw adjustment means comprises a plurality of jack screws on said first jaw abutting adjustably with a support for said jaw so that adjustment of said jack screws varies the attitude of said first jaw.

4. The feed of claim 1 wherein said means for accommodating non-planar work pieces comprises a support means, a vise guide having at least one slot formed in it, and means for interconnecting said support means through said guide so as to permit free movement of said connecting means through said guide.

5. The feed mechanism of claim 1 wherein said travel adjusting means comprises a stop plate movably supported on said bed, at least one rod, a clamp interconnecting said rod with said stop plate, and means for adjusting the interconnection of said clamp and said rod to permit movement of said rod and said stop plate along said clamp.

6. The feed mechanism of claim 5 further including second adjustment means including a stop adjustably mounted to said stop plate, and means for attaching said stop to said stop plate, said attaching means permitting adjustable movement of said stop.

7. In a feed mechanism including a bed, a first vise supported by said bed, a second vise supported by said bed and movable thereon between at least first and second positions, the improvement comprising means for controlling feed operation of said mechanism including a manifold, a plurality of control devices operatively connected to said manifold, a drive cylinder for lifting a device from a first position to a second position operatively connected to said manifold, a feed drive cylinder operatively connected to said manifold for driving said second vise reciprocally between said first and second position, a front clamp cylinder operatively connected to said manifold for operating a vise jaw of said first vise, a rear clamp cylinder operatively connected to said manifold for operating a vise jaw of said second drive, a first sensor operatively connected to said manifold, said first sensor sensing the presence of a work piece in said second vise, a second sensor operatively connected to said manifold, said second sensor sensing a first position for the device lifted by said drive cylinder, a third sensor operatively connected to said manifold, said third sensor sensing a second position for the device lifted by said drive cylinder, a feed extension sensor operatively connected to said manifold, said feed extension sensor sensing at least one position of said second vise, said control device plurality being arranged to operate said drive cylinders based on conditions sensed by said sensors to advance a work piece along said bed.

8. The feed mechanism of claim 7 wherein said drive cylinders are pneumatically operated.

9. The feed mechanism of claim 7 further including means for adjusting the length of travel for said second vise.

10. The feed mechanism of claim 9 wherein said travel adjusting means comprises a stop plate movably mounted on said bed, at least one rod, a clamp interconnecting said rod with said stop plate, and means for adjusting the interconnection of said clamp and said rod to permit movement of said rod and said stop plate along said clamp.

11. The feed mechanism of claim 9 further including second adjustment means including a stop adjustably mounted to said stop plate, and means for attaching said stop to said stop plate, said attaching means permitting adjustable movement of said stop.

12. The feed mechanism of claim 7 further including means for accommodating nonplanar work pieces operatively associated with said second vise.

13. The feed mechanism of claim 12 wherein said means for accommodating nonplanar work pieces comprises a support means, a vise guide having at least one slot formed in it, and means for interconnecting said support means through said guide so as to permit free movement of said connecting means through said guide, said guide being captured along said bed so as to restrict lateral movement of said guide.

14. The feed mechanism of claim 13 further including vise adjustment means associated with said first vise, said vise adjustment means comprising a plurality of jack screws operatively connected through a first jaw of said first vise for bearing against a support for said first vise so that movement of said jack screws alters the attitude of a face of said vise jaw.

15. In a feed mechanism including a bed, a first vise supported by said bed, a second vise supported by said bed movable thereon between at least a first position and a second position, means for driving said vise between said first and said second positions, the improvement which comprises means interconnecting said drive means in said vise for permitting said vise to accommodate warped work pieces as it moves reciprocally between first and second positions during the feed operation of said feed device, said last mentioned means including a vise guide constrained for generally reciprocal movement between said first and said second positions, said vise guide having at least one slot formed in it, and means connecting said drive means and said second vise through said slot in said vise guide so as to permit lateral movement of said connecting means in said slot during operation of said drive means.

16. The improvement of claim 15 further including control means for operating said feed.

17. The improvement of claim 16 wherein said control means comprises a plurality of sensors for determining the phase of feed operation, said sensors developing a signal based on said operation, a plurality of control devices operable in response to said sensed signals for developing a command signal, and means responsive to said command signals for operating said feed.

18. The improvement of claim 17 wherein said control means is pneumatically operated.

19. The improvement of claim 18 wherein said control means includes a manifold, said manifold comprising a laminated structure having a mounting face, said control devices being mounted to said manifold along said mounting face, and a plurality of control lines formed along said laminated structure for connecting various ones of said control devices.

20. The improvement of claim 19 further including means associated with said first vise for adjusting at least one of the pair of jaws forming said vise to enable the jaws of said vise to be set square.

21. The improvement of claim 21 further including means for adjusting the length of travel for said second vise including a first coarse adjustment and a second fine adjustment.

22. A feed mechanism, comprising:
a bed;
a first vise supported along said bed;
a second vise supported along said bed and movable thereover between at least a first position and a second position;
control means for operating said feed including a processor means having a plurality of control devices mounted to it, said processor means having a plurality of inputs and a plurality of outputs operatively connected to said feed mechanism to monitor operation thereof;
drive means for moving said second vise between said first and said second positions operatively connected to said control means; and
means for adjusting the length of travel for said second vise by defining a physical stop for said second vise, said adjusting means including a first coarse adjustment and a second fine adjustment for positioning said stop.

* * * * *